(12) United States Patent
Meijer et al.

(10) Patent No.: US 7,665,073 B2
(45) Date of Patent: Feb. 16, 2010

(54) COMPILE TIME META-OBJECT PROTOCOL SYSTEMS AND METHODS

(75) Inventors: Henricus Johannes Maria Meijer, Mercer Island, WA (US); Avner Y. Aharoni, Seattle, WA (US); David Schach, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 11/108,455

(22) Filed: Apr. 18, 2005

(65) Prior Publication Data

US 2006/0236226 A1    Oct. 19, 2006

(51) Int. Cl.
*G06F 9/45* (2006.01)
(52) U.S. Cl. .................. 717/140; 717/108; 717/116
(58) Field of Classification Search ................ 717/136, 717/140, 142, 143
See application file for complete search history.

(56) References Cited

U.S. PATENT DOCUMENTS

| | | | |
|---|---|---|---|
| 5,923,880 A * | 7/1999 | Rose et al. .................. 717/145 |
| 6,754,884 B1 * | 6/2004 | Lucas et al. ................. 717/108 |
| 7,191,433 B2 * | 3/2007 | Narad et al. ................ 717/140 |
| 7,210,138 B2 * | 4/2007 | Zatloukal et al. ............ 717/143 |
| 7,401,327 B2 * | 7/2008 | Halstead et al. ............. 717/140 |
| 2002/0095658 A1 * | 7/2002 | Shulman et al. ............. 717/111 |
| 2002/0133812 A1 * | 9/2002 | Little et al. ................. 717/140 |

* cited by examiner

*Primary Examiner*—Michael J Yigdall
(74) *Attorney, Agent, or Firm*—Workman Nydegger

(57) ABSTRACT

The subject invention pertains to a compilation system and meta-object protocol to facilitate interaction with objects of various types including but not limited to XML documents. More specifically, a delineator or dot operator can be extended to hide idiosyncratic details of interacting with objects. Code details can be generated by a compiler behind the scenes. This enables a programmer to achieve the same results while writing much simpler and intuitive code.

17 Claims, 12 Drawing Sheets

COMPILE TIME META-OBJECT PROTOCOL SYSTEMS AND METHODS

COPYRIGHT NOTICE

A portion of the disclosure of this patent document contains material, which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

TECHNICAL FIELD

The subject invention relates generally to computers and more particularly toward compilers and computer programming languages.

BACKGROUND

Programming languages continue to evolve to facilitate specification by programmers as well as efficient execution. In the early days of computer languages, low-level machine code was prevalent. With machine code, a computer program or instructions comprising a computer program were written with machine languages or assembly languages and executed by the hardware (e.g., microprocessor). These languages provided a means to efficiently control computing hardware, but were very difficult for programmers to understand and develop sophisticated logic. Subsequently, languages were introduced that provided various layers of abstraction. Accordingly, programmers could write programs at a higher level with a higher-level source language, which could then be converted via a compiler or interpreter to the lower level machine language understood by the hardware. Further advances in programming have provided additional layers of abstraction to allow more advanced programming logic to be specified much quicker then ever before. However, these advances do not come without a processing cost.

Compilers and/or interpreters bear the burden of translating high-level logic into executable machine code. In general, a compilers and/or interpreters are components that receive a program specified in a source programming language (e.g., C, C#, Visual Basic, Java . . . ) and covert the logic provided thereby to machine language that is executable by a hardware device. However, the conversion need not be done verbatim. In fact, conventional compilers and/or interpreters analyze the source code and generate very efficient code. For example, programmers write code that sets forth a logical flow of operations that is intuitive and easy for humans to understand, but is often inefficient for a computer to execute. Compilers and/or interpreters can identify inefficiencies and improve program performance at the hardware level by eliminating unnecessary operations and/or rearranging the execution of instructions but still achieving the intended results. In this manner, programmers can create robust and efficient software programs.

Extensible Markup Language (XML) has become quite a popular programming language. XML is a markup language that provides a format for describing structured data. Similar to HTML (Hyper Text Markup Language), XML is a tag-based language that defines a strict tree structure or hierarchy. XML is a derivative of Standard Generalized Markup Language (SGML) that provides a format for describing and exchanging structured data in an open text based format. Unlike HTML, which is a display-oriented language, XML is a general-purpose language for representing structured data without including information pertaining to how it is to be displayed. XML consists of elements, and attributes, among other things.

XML elements are structural constructs that consist of a start tag, an end or close tag, and the information or content that is contained between the tags. A start tag is formatted as "<tagname>" and an end tag is formatted as "</tagname>." In an XML document, start and end tags can be nested within other start and end tags. All elements that occur within a particular element must have their start and end tags occur before the end tag of that particular element. This defines a strict tree-like hierarchical structure. Each element forms a node in this tree, and potentially has child or branch nodes. The child nodes represent any XML elements that occur between the start and end tags of the parent node.

XML can accommodate an infinite number of database schemas. Within each schema, a dictionary of element names is defined. The dictionary of element names defined by a schema is referred to as a namespace. Within an XML document, element names are qualified by namespace identifiers. When qualified by a namespace identifier, a tag name appears in the form "[namespace]:[tagname]". This model enables the same element name to appear in multiple schemas, or namespaces, and for instances of these duplicate element names to appear in the same XML document without colliding. Start tags can declare an arbitrary number of attributes, which declare property values associated with the element being declared. Attributes are declared within the start tag using the form "<[tagname] [attribute1],[attribute2] . . . , [attributeN]>", where an attribute$_1$ through attribute$_N$ are declarations of an arbitrary number of tag attributes. Each attribute declaration is of the form "[attributeName]=[attributeValue]" where each attribute is identified by a unique name followed by an "=" character, followed by the value of the attribute.

To facilitate such interaction with XML documents via high-level object oriented programming languages, for instance, an XML Application Program Interface (API) can be employed. An XML API provides a set of rules or a protocol to enable communication between an XML document and client application. There are a number of different types. For example, there are push APIs like SAX (Simple API for XML) where an API parser serializes a document and pushes the parsed data to a client application. Another type of XML API is a tree-based API such as DOM (Document Object Model). With this type of API, an XML document is parsed and an object model comprising a tree or hierarchy of nodes for XML elements, attributes, etc is constructed and housed in memory. Methods can then be directed at the object model for retrieving, modifying and adding data to the document. There are also query-based APIs. With these, XML documents are searched and data is returned in accordance with the search utilizing XPath (XML Path Language), for example. XPath is a language that locates and addresses information in an XML document by navigating through its elements and attributes. XPath queries are specified in terms of paths and expressions. In essence, XPath is incorporated into a programming application (e.g., C#, Java, Visual Basic . . . ) just like SQL (Structured Query Language). A user can query a database from within an application by specifying SQL queries. A database management system will receive these queries and return the results. Likewise, an XPath query can be specified within an application, and an XPath engine will process the query against an XML document and return requested information.

Conventional APIs for processing XML are notoriously difficult to use. They provide a document object model over data in the XML document utilizing types such as XmlNode and XPathNavigator. To navigate a typical XML document object model, a user has to deal with several classes whose interaction is often complex and counter intuitive. For example, the System.Xml.XPath namespace contains a variety of classes that allow users to load an XML document, to navigate toward specific nodes using XPath queries represented by plain strings and then imperatively iterate through these nodes to pick out values that a user is ultimately interested in retrieving. The iterator iterates over a collection of navigators each navigator has the Select( ) method that returns an iterator over the new set of navigators that points to the nodes that were selected.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns systems and methods to facilitate simple and intuitive programming. More specifically, compilation systems and methods are provided that support overloading a delimiter operator such as the dot operator to hide programmatic details from programmers. These details can be determined and automatically generated and injected under the covers by a compiler. According to a specific aspect of the subject invention, access to XML documents is made easier by the systems and methods provided herein. However, the subject invention is not so limited.

According to an aspect of the subject invention, a compilation system is provided comprising a receiver component for receiving a delimited programmatic expression, a type detection component to determine a type associated with the expression and a generation component that generates a translated expression. The translated expression can comprise at least a portion that includes a generic method call initially not bound to a specific implementation. For example, if a programmatic expression is delimited by a dot operator a generic method "Dot( )" can be generated. Later a specific implementation can be bound to the generic method, for example based on the expression type. Hence, based on the type of the object or thing that is to be accessed, there is a special protocol or meta-object protocol that is executed that provides some additional work behind the scenes that is invisible to a programmer.

According to an aspect of the invention, a programmer need only specify an expression or qualified identifier comprising related elements delimited by some object or character. The subject systems and methods can automatically generate the proper code, for example based on the type of the object being accessed. Therefore, access to XML documents can be specified the same way access to class members is specified in typical object-oriented programming languages. Upon compilation, the appropriate protocols will be executed to facilitate the specified data access.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

Figure 1:
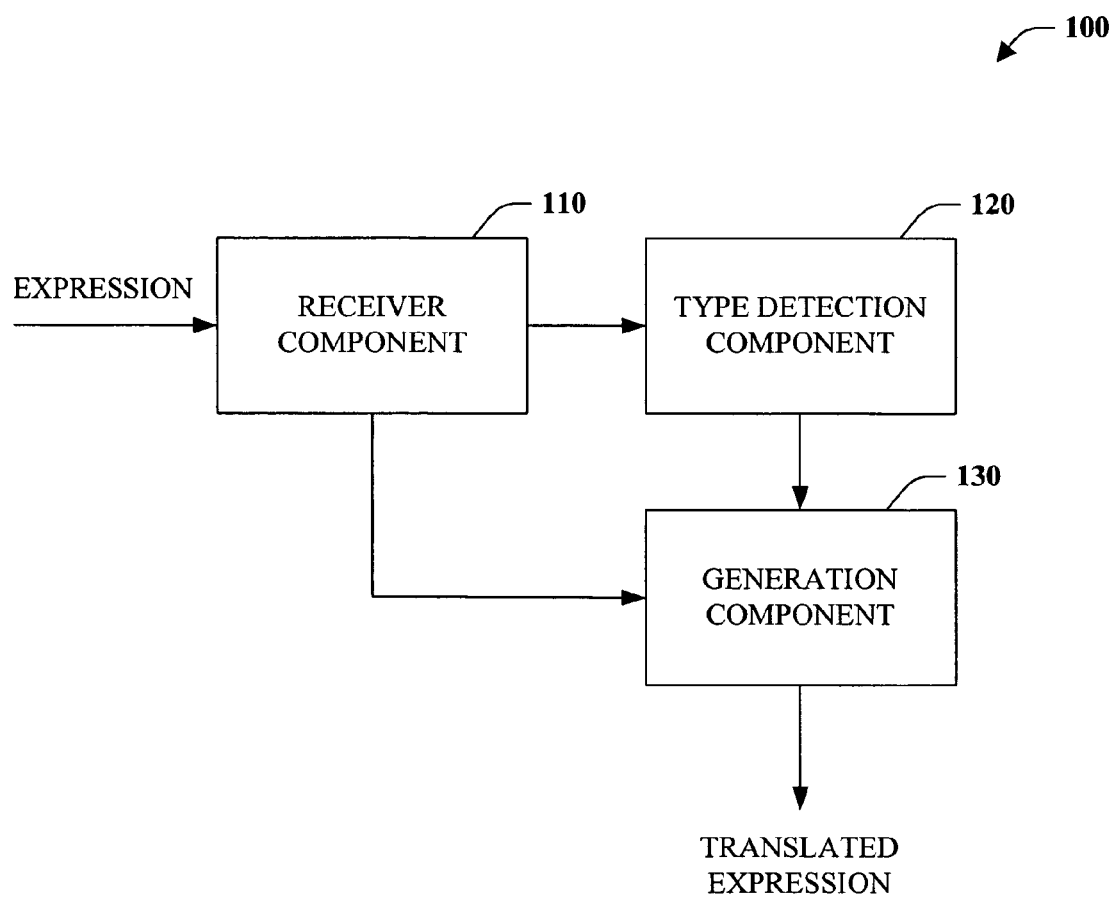
FIG. 1 is a block diagram of a compilation system in accordance with an aspect of the subject invention.

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Artificial intelligence based systems (e.g., explicitly and/or implicitly trained classifiers) can be employed in connection with performing inference and/or probabilistic determinations and/or statistical-based determinations as in accordance with one or more aspects of the subject invention as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Furthermore, the subject invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Turning initially to FIG. 1, a compilation system 100 is illustrated in accordance with an aspect of the subject invention. Compilation system 100 can include receiver component 110, type detection component 120, and generation component 130. Receiver component 110 can receive and/or retrieve expressions or qualified identifiers. According to an aspect of the invention, such expressions can be delimited programmatic expressions. In particular, the programmatic expression can be a member access expression of the form Member-Access-Expression::=Receiver-Expression Delimiter Message-Identifier. For example, such expressions can correspond to X.Y. X!Y, X.@Y, X.Y.Z, and the like, where there are at least two elements (e.g., X, Y . . . ) separated by a delimiter (e.g., dot (.), series of dots ( . . . ), exclamation point (!), pound sign (#) . . . ). Furthermore, it should be appreciated that the message-identifier can take on any of a myriad of forms including but not limited to (a) [identifier], pr, (b) @attribute, (c) @[An Attribute], (d) prefix:name, (e) @prefix:name, (f) [prefix]:[name], or any combination thereof. Receiver component 110 is communicatively coupled to type detection component 120 and generation component 130. Type detection component 120 can determine the type associated with an element in the received programmatic expression. In particular, the type detection component 120 can determine type from the element preceding the delimiter or the first element. Such an element can correspond to an object or class defining the object. The type determination can be made by analyzing the declared element and its return type and/or checking a type declaration preceding the specified element as is often specified. The determine type can then be communicated to the generation component 130 from the type detection component 120. Accordingly, the generation component 130 can receive, among other things, type information as well as the programmatic elements themselves.

Generation component 130 can generate or produce translated expressions. Programmatic expressions are often simplified or abbreviated to facilitate straightforward and intuitive programming. Behind the scenes, a compiler or interpreter component(s) can translate the expression into its proper format. In essence, an abstraction of the actual implementation is provided for specification by programmers to increase programming efficiency and eloquence. Generation component 130 provides similar functionality here. In the simple instance where there are two elements separated by a delimiter such as a dot. The analysis component can analyze the second element relative to the first. A determination can be made as to whether the second element represents or is a member of the type of the first element. For example, a determination can be made concerning whether the second element is a property or field of the first element type. If it is, then a translated expression can be generated that incorporates standard or normal methods for the delimiter such as get and set methods. For example, if an expression is C.age, where C is of type Customer and age is a property of the type or class Customer, the translated expression C.get_age( ) can be generated. However, if the second element is not a member or direct member of the type of the first element, then the generation component can generate a generic method call as the translated expression. For example, the generic method call can for an expression X.Y could be X.Dot("Y"). This generic method call does not specify a particular translation. In accordance, with an aspect of the invention, the generic method call increases the flexibility associated with the expression, as it is not bound to any particular implementation initially. The generic method implementation later can be tied to an implementation based on the type of the first element, for instance. Stated differently, the delimiter operator, or in the example above, the dot operator can be overloaded to hide an interpretive layer or provide an additional layer of abstraction.

Figure 2:
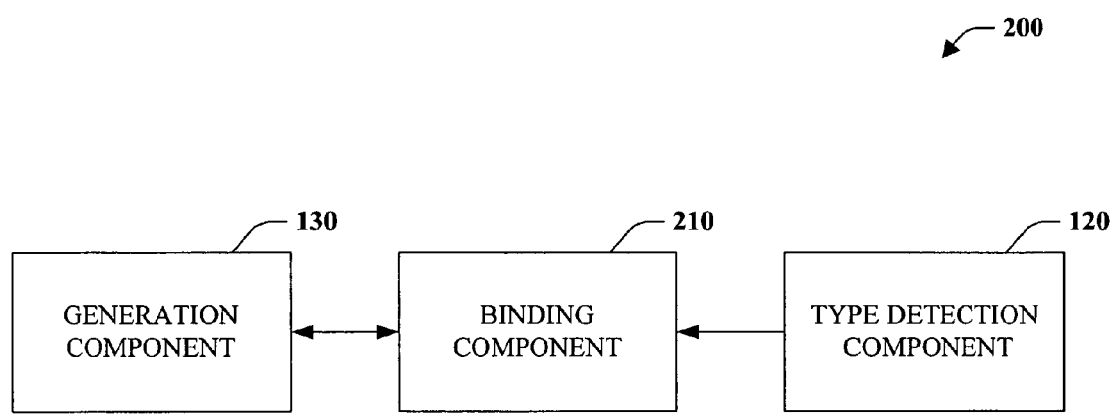
FIG. 2 is a block diagram of a compilation system in accordance with an aspect of the subject invention.

FIG. 2 depicts a compilation system 200 in accordance with an aspect of the subject invention. System 200 includes type component 120, binding component 210 and generation component 130. Type detection component determines a type associated with a received expression. In particular, in a member-access expression, the type detection component 120 can ascertain the type of the first element or receiver expression. Generation component 130 can generate a translated expression from an initially provided expression. For example, the generation component 130 can receive a simplified expression and based on that expression's elements (e.g., receiver expression, delimiter, message identifier) can generate an expanded translated expression. Binding component 210 binds the code or expression generated by generation component 130 to a specific implementation or type. According to one aspect of the invention, the bind component 210 can correspond to the type identified by type detection component 120. A type or data type defines a particular type, kind, or classification of data.

It should be appreciated that compilation system 200 can correspond to or implement a compile time meta-object protocol. For instance, generation component 120 can initially produce a generic expression or method call based on the received expression. The generic method call can be generated by a compiler initially upon analyzing a received expression. As provided supra, the translated expression can include the generic expression such as X.Dot("Y"), for example. The binding component 220 binds or ties the generic expression to a particular implementation. In particular, the binding component 220 can bind the generic expression or more specifically the generic method call to the type provided by the type detection component 120. For example, if the type is an XML object type the generation component would be bound to specify XML code that replaces the generic method in the translated expression. For example, X.Dot("Y") could be replaced with X.Current.SelectChildren("Y"). In other words, the generation component 130 can produce a translated expression in accordance with a type specific implementation of the generic method call, in this example the Dot method. This indirection or generality provided by the system of the subject invention enables compiler extensibility. For every different data form or type, the compilation thereof can be different rather than hard coded or tied to a specific implementation.

Figure 3:
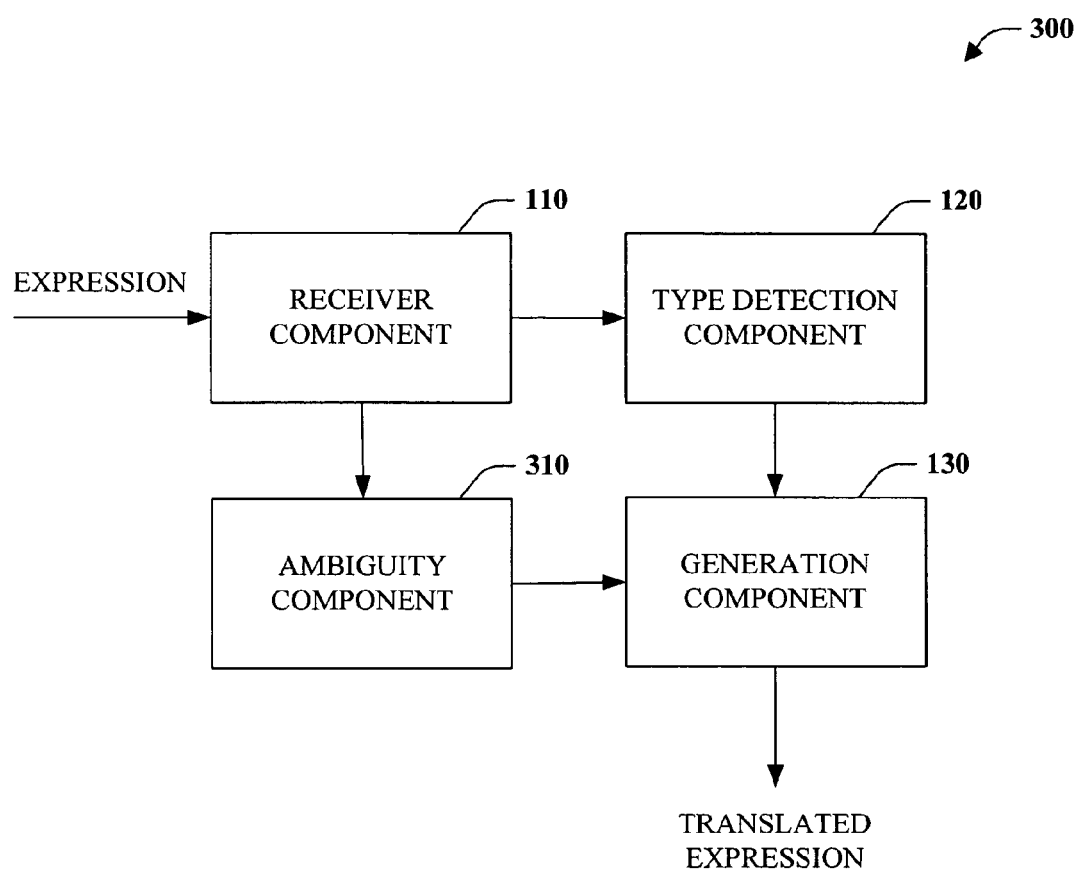
FIG. 3 is a block diagram of a compilation system in accordance with an aspect of the subject invention.

FIG. 3 depicts another compilation system 300 in accordance with an aspect of the subject invention. Similar to system 100 of FIG. 1, system 300 includes a receiver component 110, a type detection component 120, and a generation component 130. The receiver component 110 receives and/or retrieves a delimited programmatic expression, a qualified identifier, or a member access expression. The type detection component 120 determines the type of an element in the expression such as the first element. The generation component 130 receives a type from the type detection component 120 and expression elements (e.g., first element, delimiter, second element . . . ). System 300 also includes an ambiguity component 310. Ambiguity component 310 can be utilized in conjunction with the generation component 130 to facilitate resolving ambiguities regarding the transformed expression to be generated. As mentioned previously, the generation component 130 is operable to determine whether the second element in an expression is a member (e.g., field, property) of the type of the first expression, for instance. If the second element is a member of the type of the first, a specific translation expression was generated by generation component 110, rather than a generic method call. This corresponds to generation of standard or normal member access code. However, a programmer may want the generic method call to be generated by the compiler even when the second element is a member of the type of the first. Ambiguity component 310 can be of assistance in such a situation. For example, ambiguity component 310 can store or access a default rule for dealing with an ambiguous situation and provide direction to the generation component 130. In accordance, with another aspect of the invention the ambiguity component can analyze the delimiter or delimiters associated with the expression to determine how to resolve the situation. In this manner, programmers are empowered to specify how they would like the expression to be compiled. For example, instead of writing X.Y, the programmer could write X!Y or X.!Y to indicate that the compiler should generate a generic method call even if the second element is a member of the type of the first. Hence, ambiguity component 310 can retrieve the delimiter(s), utilize them to determine how a translated expression should be generated, and provide that information to the generation component 130. In other words, the ambiguity resolution component determination can be influenced by an expression delimiter such that either the ambiguity component defaults to normal member access and can be overridden by a particular delimiter to produce special member access code or defaults to special member access code which may be overridden by the presence of a particular delimiter to produce normal member access code.

Figure 4:
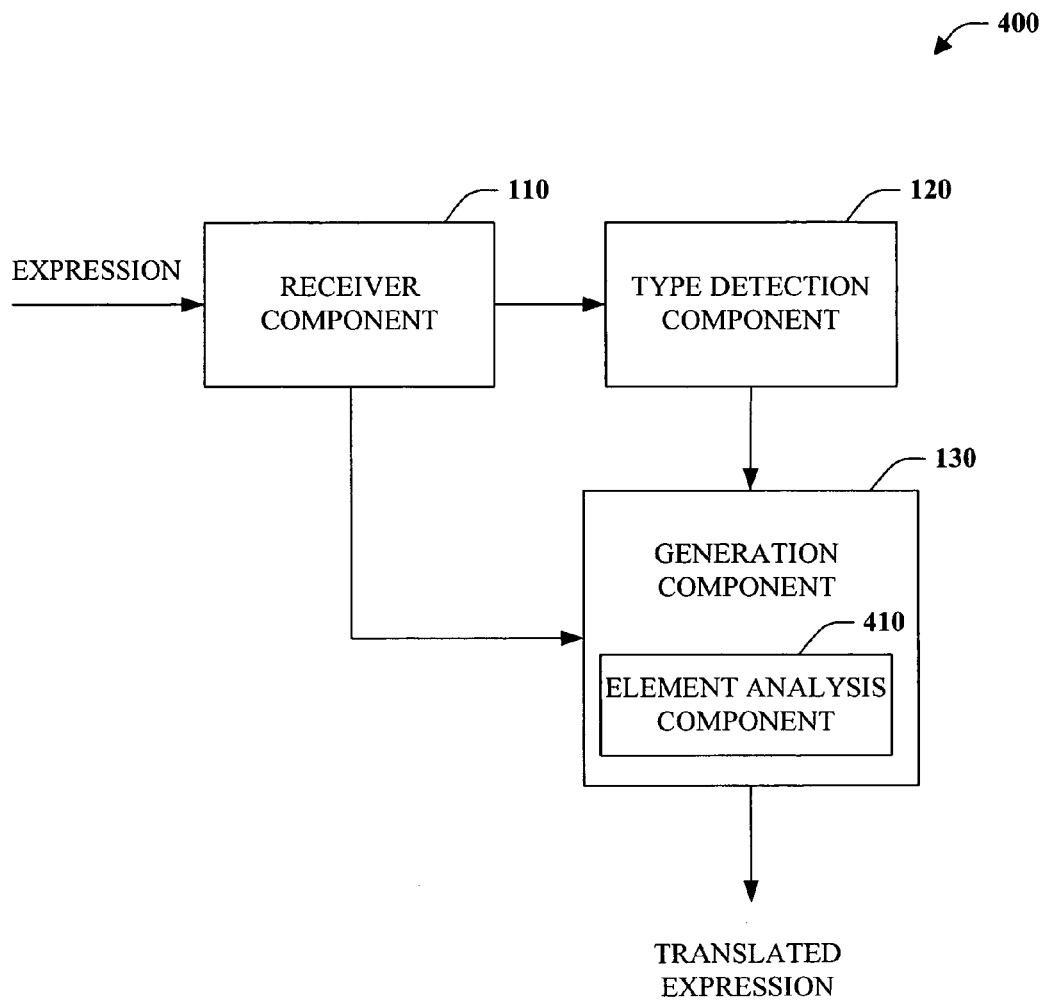
FIG. 4 is a block diagram of a compilation system in accordance with an aspect of the subject invention.

FIG. 4 presents a compilation system 400 in accordance with an aspect of the subject invention. Similar to systems 100 (FIG. 1) and 300 (FIG. 3), system 400 includes receiver component 110, type detection component 120 and generation component 130. Again, receiver component 110 receives a delimited programmatic expression or qualified identifier. Type detection component 120 is operable to determine the type of the first element in an expression. Generation component 130 receives the type information as well as the expression elements themselves and generates a translated expression. If the second element is not a member of the type of the first class, then the generation component 130 can generate a generic method call. However, this need not be the same generic method call. Generation component 130 includes or can be communicatively coupled to an element analysis component 132. Element analysis component 132 can analyze elements in a programmatic expression. In particular, it can scrutinize an element following a delimiter to determine its type or kind of data. A generic method call can then be generated that is more specifically tailored to the element following the delimiter. For example, the element analysis component 132 can determine that the second element is an attribute and communicate this information to the generation component 130. The generation component can then generate a unique generic method call. For example, rather than generating X.Dot("Y"), the generator component 130 could generate X.DotAttribute("Y"). Similarly, at a later point the generic method can be bound to a specific implementation particularly for DotAttribute( ) in the above example.

Figure 5:
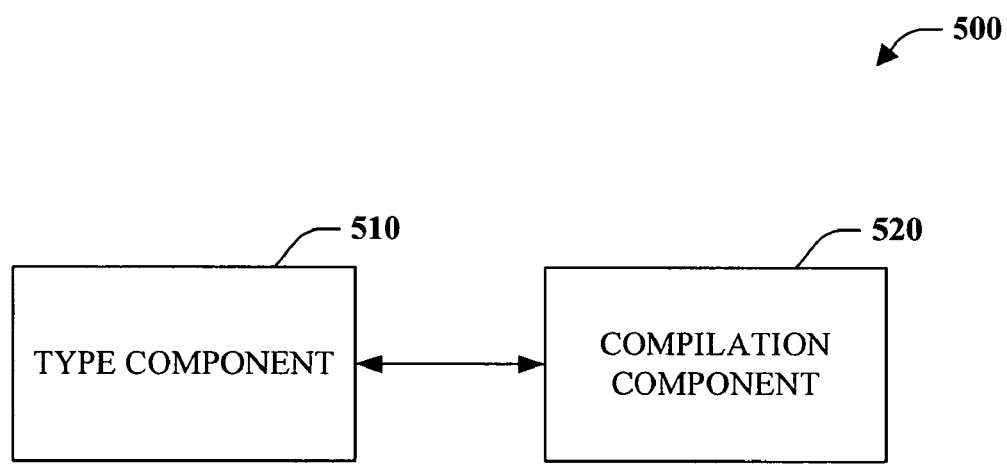
FIG. 5 is a block diagram of a compilation interaction system in accordance with an aspect of the subject invention.

Turning to FIG. 5, a compilation interaction system 500 is illustrated in accordance with an aspect of the subject invention. System 500 includes a type component 510 and a compilation component 520. Type component 510 and compilation component 520 are communicatively coupled. For example, the components may communicate via data packets transmitted there between. A type component 510 defines an object and can include, among other things, one or more methods and associated implementations. Accordingly, the type component 510 can correspond to a programmatic class as specified in an object oriented programming language. The compilation component 520, inter alia, can generate a generic method call associated with translating all or part of an expression being compiled. For example, the generic method call can be the dot as previously discussed (e.g., X.Dot("Y")). The generic method call is very flexible, as the implementation of that method is not bound to anything specific. The type component 510 can provide a specific implementation of the generic method for its particular type and objects of that type. For example, it can include a Dot method implementation. In order to obtain the implementation for its generic method and generate a translated expression, the compilation component 520 must first locate a specific type component 510 and subsequently negotiate therewith. In essence, the compilation component 520 communicates and informs the type component 510 that it has a particular generic method and possibly some arguments that are associated with the type component 520. The type component 520 can then inform the compilation component how to implement the method. In a conventional, language translation system the implementation is hard coded. Therefore, if a user specifies C.age, it is always translated to C.get_age( ), for example. This is not very flexible or extensible. Here, the compilation component 520 calls a generic method and the type component 510 provides some complex logic that the compiler does not know about and yet it still the compilation component 520 produces the desired behavior.

As will be appreciated by those artisans of ordinary skill in this field, various portions of the disclosed system may include or consist of artificial intelligence- or knowledge based components. For example, the generation component 130 of FIGS. 1, 3, and 4, may use a neural network to facilitate generation of translation expressions. Furthermore, the subject invention can employ classifiers that are explicitly trained, for example, using generic training data, as well as implicitly trained, such as by observing user behavior or receiving extrinsic information. For example, SVM's are configured using a learning or training phase within a classifier constructor and feature selection module. Thus, the classifier(s) can be used to automatically perform a number of functions.

According to a particular aspect of the invention, such a system as described above can be utilized to facilitate access to XML data and documents. Existing application programming interfaces (APIs) for processing XML are notoriously difficult to use. They provide a document object model over the data in the XML document using types such as XmlNode and XPathNavigator. To navigate a typical XML document object model, a user has to deal with several classes whose interaction is often complex and counter intuitive. For instance, the System.Xml.XPath namespace contains a variety of classes that allow users to load an XML document, to navigate towards specific nodes using XPath queries represented by plain strings and then imperatively iterate through these nodes to pick out the values with which a user is ultimately interested. The iterator iterates over a collection of navigators that points to the nodes that were selected.

Consider the complexity in the following example where two documents that contain books are joined based on their title and the output includes a list of the books and their prices in each document. A user can then navigate the list by creating navigator objects on the document and the calling the Select( . . . ) method to create iterators that in turn contain navigators on the selected nodes, etc.

```
static void UseXPathDocument
  (string reviewsLocation, string bibLocation, XmlTextWriter xtw) {
  XPathDocument bib = new XPathDocument(bibLocation);
  XPathDocument reviews = new XPathDocument(reviewsLocation);
  xtw.WriteStartElement("books-with-prices");
  XPathNodeIterator books = bib.CreateNavigator( ).Select("/bib/book");
  while (books.MoveNext( )) {
    XPathNodeIterator entries =
      reviews.CreateNavigator( ).Select("/reviews/entry");
    XPathNodeIterator bookTitleItr =
      books.Current.SelectChildren("title"," "); bookTitleItr.MoveNext( );
    XPathNodeIterator bookPriceItr =
      books.Current.SelectChildren("price"," "); bookPriceItr.MoveNext( );
    while(entries.MoveNext( )) {
      XPathNodeIterator entryTitleItr =
        entries.Current.SelectChildren("title"," "); entryTitleItr.MoveNext( );
      XPathNodeIterator entryPriceItr =
        entries.Current.SelectChildren("price"," ");
      entryPriceItr.MoveNext( );
      if (entryTitleItr.Current.Value == bookTitleItr.Current.Value) {
        WriteBook(xtw,bookTitleItr.Current, entryPriceItr.Current,
          bookPriceItr.Current);
      }
    }
  }
  xtw.WriteEndElement( );
}
```

The developer writing this code needs to be intimately familiar with the interaction between the various classes as provide above. In addition, the developer needs to understand the subtle semantics of the XPath query language, write many imperative statements to explicitly navigate through a tree hierarchy, and retrieve the appropriate values. Further yet, the developer needs to understand the additional layer of interpretation of using various methods such as Select( ) and SelectChildren( ). In contrast, to navigate standard object models or classes programmers can directly use the more traditional "object.name" operator to access "children" of objects rather than calling object.SelectChildren("name").

One way to allow for a more direct navigation of XML documents using ordinary member access is to deserialize an XML document into a corresponding object graph where roughly each XML element is represented by a class that contains field or property members of each child element of that particular element. However, there are several downsides to this approach. First of all, this requires that the schema of the document in question be known at program construction time, which is often not the case. Even when the document schema is available, the XML and object schema languages differ very significantly, and in many cases it is not possible to create a faithful mapping between XML schema and a set of object oriented classes. Furthermore, deserialization invariably leads to loss of fidelity of the XML document; meaning that round tripping a document by first deserializing it into an object and then serializing back into XML does not result with which you started.

According to an aspect of the subject invention, a delimiter operator such as the dot operator can be overloaded to hide the interpretive layer of having to call Select( ) and SelectChildren( ), for example, allowing a user to directly access members on a receiver of type XML. A compiler can generate the required code to the appropriate member selection methods under the covers. This provides the same results as above by writing much simpler and intuitive code. Consider the following code snippet the same functionality as the previous code snippet. The new code is bold faced.

```
static void UseDynamicXPathDocument(string reviewsLocation, string
bibLocation, XmlTextWriter xtw) {
  DynamicXPathDocument bibDoc = new
DynamicXPathDocument(bibLocation);
  DynamicXPathDocument reviewsDoc = new
DynamicXPathDocument(reviewsLocation);
  xtw.WriteStartElement("books-with-prices");
  foreach (DynamicXPathNavigator book in bibDoc.bib.book)
    foreach(DynamicXPathNavigator entry in reviewsDoc.reviews.entry)
      if ((string)book.title == (string)entry.title)
        WriteBook(xtw,book.title, entry.price, book.price);
  xtw.WriteEndElement( );
}
```

In this example, once the DynamicXPathDocument is created the top level elements now seem to appear as regular properties of the bibDoc object. Selecting bibDoc.book.bib returns a collection of DynamicXpathNavigator objects that point to applicable child nodes or an attribute with that property name. This collection itself can have a property that represents the child nodes of each navigator in that collection. Once this collection is cast to a string (implicitly or explicitly) the current navigator value is returned.

The conventional compilation of the dot (".") operator is employed to search in the receiver type (left side of the dot) for the member that matches the specified member (right side of dot). However, in accordance with an aspect of the invention this technique is modified to add behavior for when this conventional search fails. However, a variation of this scheme can be to always insert the non-standard behavior.

If the XML API class does not have a direct member that matches the member (after the dot, a compiler system can insert instead a generic method call to the "Dot" or alternatively "DotAttribute." These methods return the applicable XML nodes by calling applicable methods so that the expressions that use the dot operator are composable. To illustrate such composability, consider the following code fragment:

DynamicXPathDocument bibDoc=new DynamicXPathDocument(bibLocation); foreach (DynamicXPathNavigator book in bibDoc.bib.book){

Here the bibDoc does not have a member called bib thus a generic Dot method can be inserted that specifies bib as an argument as follows:

foreach (DynamicXPathNavigator book in bibDoc.Dot("bib").book){

The return type for the Dot method is DynamicXPathNavigator on DynamicXPath Document and such type does not have a book member. Hence, another call can be inserted to the Dot method. As a result, the expression bibDoc.bib.book is translated into the expression bibDoc.Dot("bib").Dot("book") as shown in the following code snippet:

Foreach (DynamicXPathNavigator book in bibDoc.Dot("bib").Dot("book"))

It should also be appreciated that programmers as well as generation component 130 (FIGS. 1, 3 and 4) and compilation component 520 (FIG. 5) may have to compensate for particular identifiers differently. As discussed previously, an expression like books.price can be specified. However, identifiers need not be specified as single word strings. For example, an identifier could correspond to an XML tag <large-print-book>. Uses of dashes or minus signs are legal in XML. However, if a user specified books.large-print-books this could be problematic. For example, a language such as C# could interpret this arithmetically as books.large minus print minus books, which would likely generate an error. Accordingly, the subject invention contemplates use of additional delimiters to eliminate such confusion, for example books. [large-print-books], books.<large-print-books> or books.large\-print\-books could be employed.

Furthermore, various delimiters can map to various XPath axes (e.g., child, descendant, ancestor, parent, attribute, namespace . . . ). For instance, a series of two dots ( . . . ) can map to descendents, while a series of three dots ( . . . ) could map to ancestors, and the like.

In view of the exemplary systems described supra, methodologies that may be implemented in accordance with the present invention will be better appreciated with reference to the flow charts of FIGS. 6-9. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
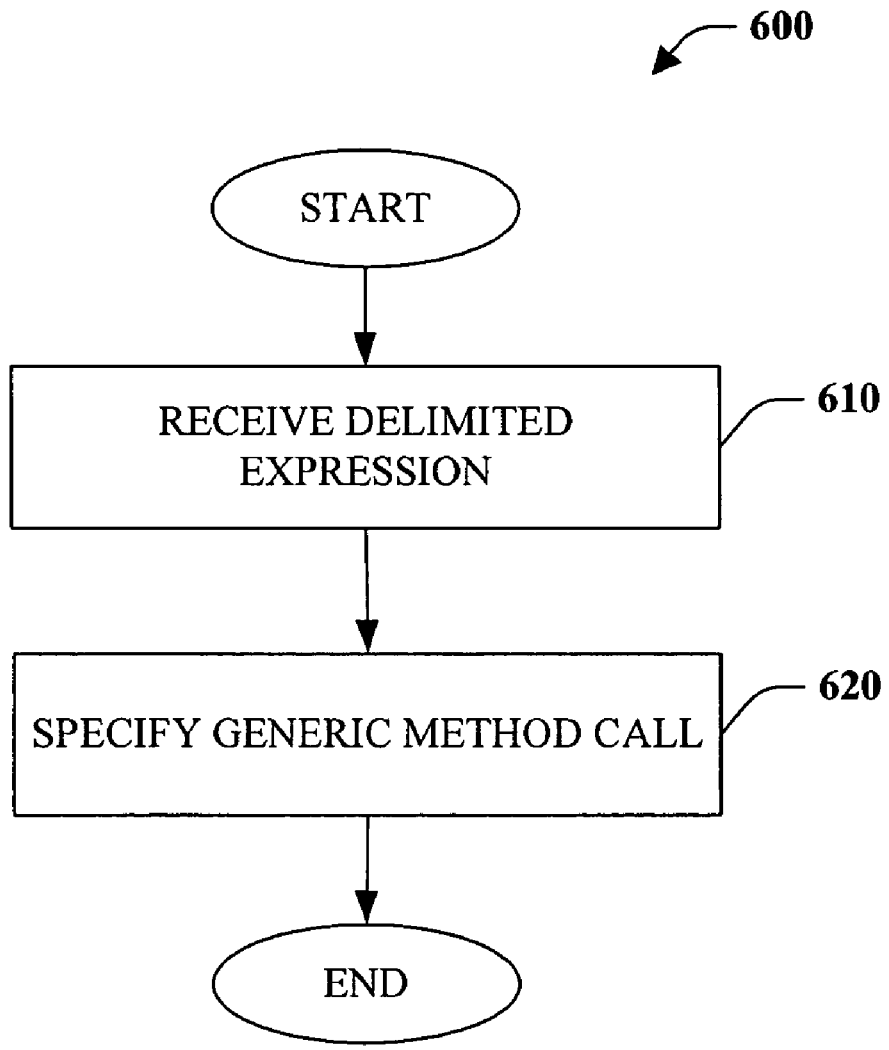
FIG. 6 is a flow chart diagram of a compilation methodology in accordance with an aspect of the subject invention.

Turning to FIG. 6, a compilation method 600 is illustrated in accordance with an aspect of the subject invention. At 610, a delimited expression, qualified identifier, or member access expression is received. For example, the expression could be X.Y. In such an example, X represents an object and Y represents an associated element or element associated with the object in some manner. At 620, a translated expression is generated. Initially, the translated expression may include a generic method call not bound to any particular implementation. The generic method call specifies that there is some relationship between the object and the associated element. By way of example, the produced generic method call can correspond to a dot method where the associated element is an argument thereto such as Dot("Y"). Thus, the translated expression corresponds to X.Dot("Y") and the generic dot method can be bound to a particular implementation based at least in part upon the type of the object X, at a later time (e.g., compile time).

Figure 7:
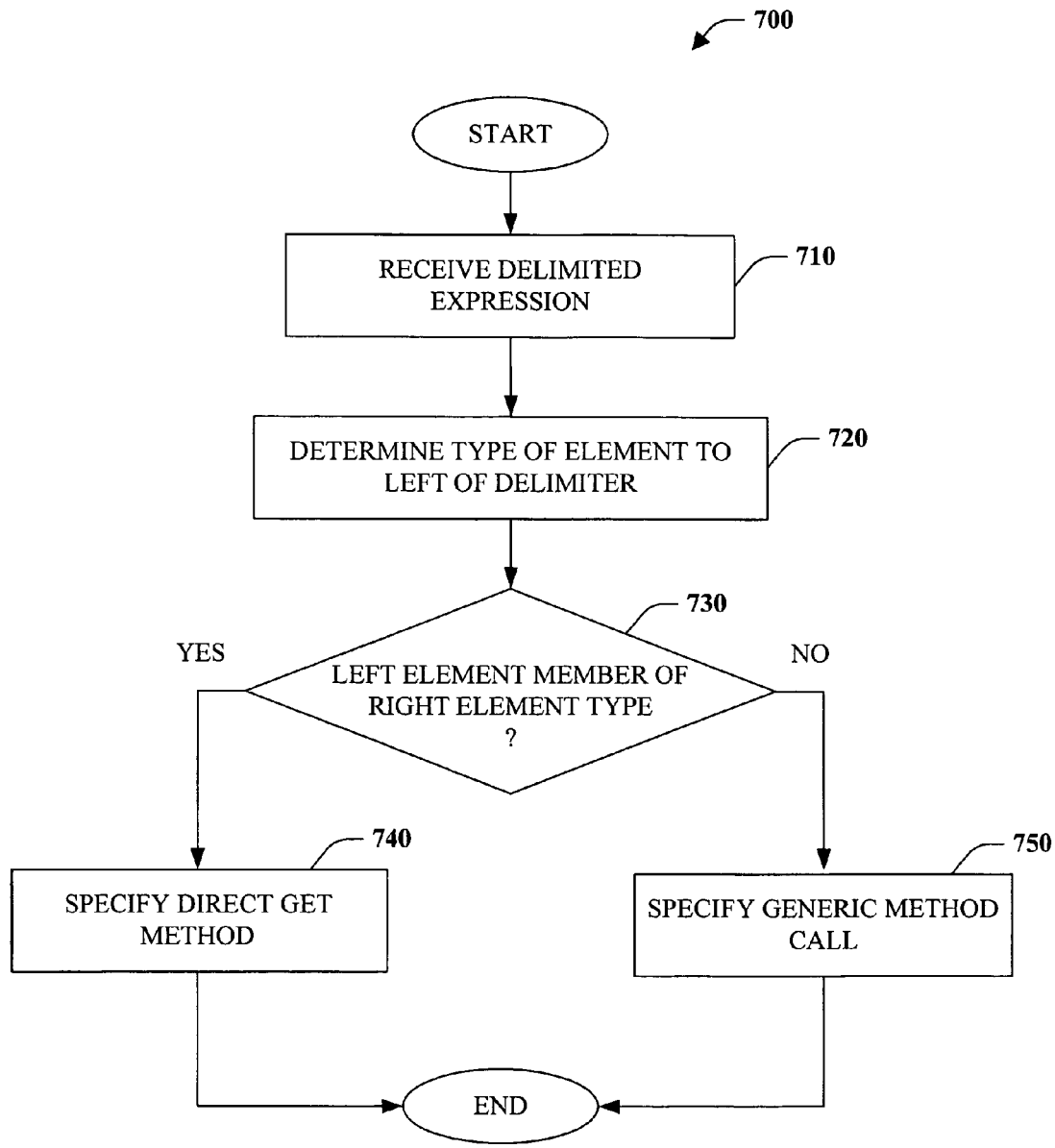
FIG. 7 is a flow chart diagram of a compilation methodology in accordance with an aspect of the subject invention.

FIG. 7 a compilation methodology 700 is depicted in accordance with an aspect of the subject invention. At 710, a delimited programmatic expression or qualified identifier is received. As previously described, the expression can consist of at least two elements separated by one or more delimiters. The first element can correspond to an object while the remaining elements can be associated with the first element in some manner. The expression can be a member access expression of the form Member-Access-Expression::=Receiver-Expression Delimiter Message-Identifier. Accordingly, an exemplary generic expression could be X.Y. At 720, the type of the object, specified by the first element left of the delimiter, is determined. At 730, a determination is made as to whether associated element to the right of the delimiter is a member of the type of the object or element to the left of the delimiter. For example, the right element could be a member such as a property or field of the type of the first element. If the right element is a member of the type of the left element, then at 740 a standard direct get method is specified for the element to the right of the delimiter, such as get_Y( ). Accordingly, the entire translated expression would read X.get_Y( ) rather than the initially received X.Y. If, however, the right element is not a member of the type of the left element, then at 750 a generic method call is specified for the right element. In the subject example, such a method could correspond to Dot("Y") where Y is now an argument to the generic method. The entire translated expression corresponds to X.Dot("Y"). Here, the generic method is not tied to any particular implementation, as is the case where the right element is a member of the type of the left element. Accordingly, this compilation methodology 700 expands the conventional scenario of directly tying the operation between two elements to a specific implementation, which provides for flexibility and extensibility while still supporting the standard case. Stated differently, methodology 700 can correspond to a meta-object protocol that overloads the functionality of a delimiter such as the dot operator.

Figure 8:
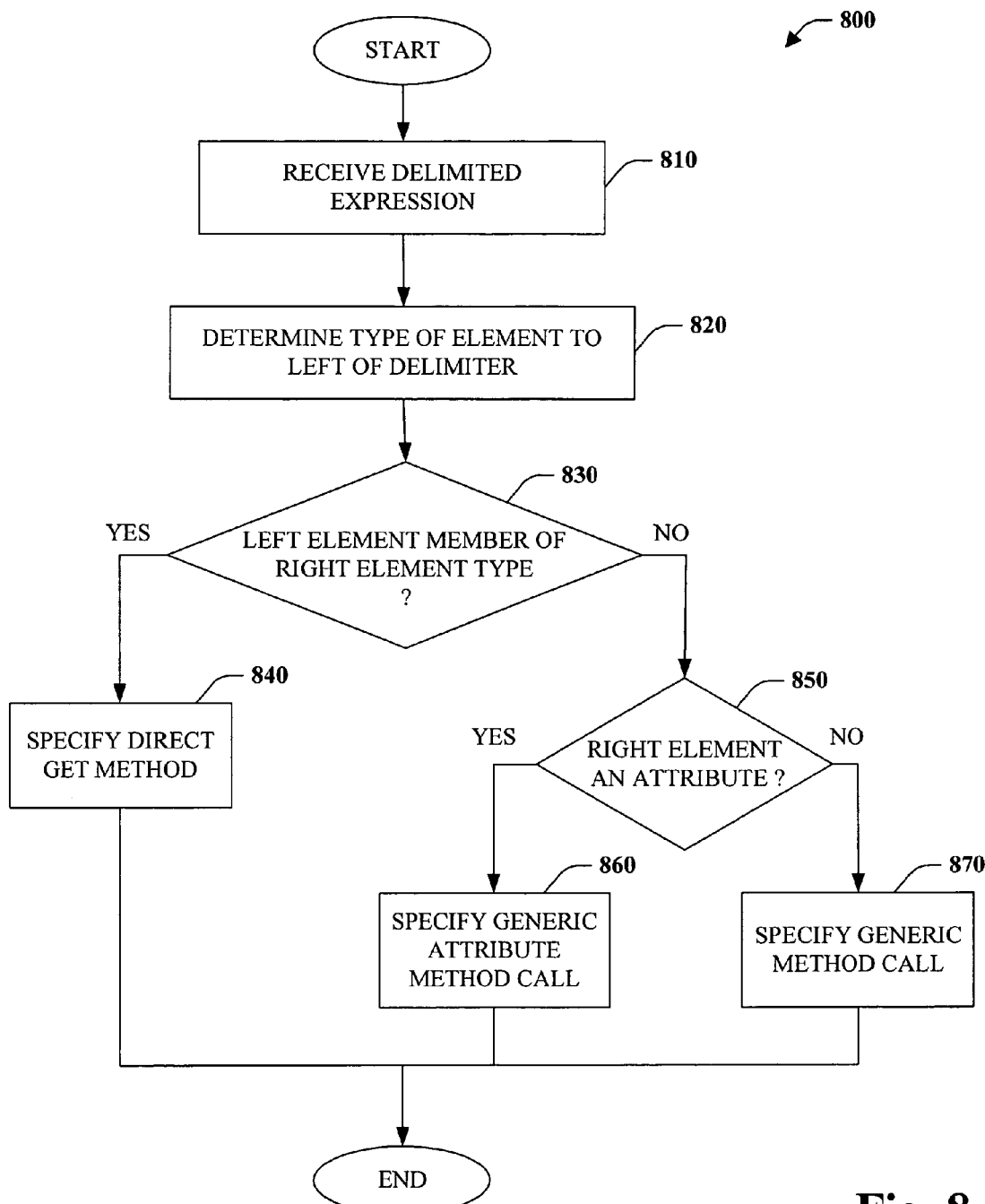
FIG. 8 is a flow chart diagram of a compilation methodology in accordance with an aspect of the subject invention.

Turning to FIG. 8, a compilation methodology 800 is illustrated in accordance with an aspect of the subject invention. Methodology 800 begins with similar actions as methodology 700 of FIG. 7. At 810, a delimited programmatic expression is received. The programmatic expression can include at least two elements separated by at least one delimiter. The first element to the left of the delimiter can correspond to an object while the element(s) to the left of the delimiter can be elements associated with the object At 820, the type of the element to the left of the delimiter is determined. At 830, a determination is made as to whether the element to the right of the delimiter is a member of the type of the element to the left of the delimiter. For example, an item can be a member of a type if it corresponds to a field or property, among other things, of the type or class implementing the type. If the element is a member of the type, than at 840 a direct getter method is specified for the expression. For example, the expression can be transformed from X.Y to X.get_Y( ). This would be a standard implementation for the dot operator. However, if the element is not a member of the type of the element to the left of the delimiter, then at 850 a determination is made as to whether the right element is an attribute. This can be determine, for example, by identifying whether the element or the delimiter includes a symbol such as "@." If the element to the right of the delimiter is an attribute than a generic method can be generated for the element, which indicates that it is an attribute such as DotAttribute("Y"). Accordingly, an original expression of X.Y can be transformed to X.DotAttribute("Y"), for example. If at 850 it is determined that the element is not an attribute then at 860 a generic method call can be generated such as Dot("Y"). An original expression of X.Y, can, in this instance, be transformed to X.Dot("Y").

It should be appreciated that methodology 800 is merely exemplary. A similar methodology can be employed for other particular elements including but not limited to selection of descendants. For example, a delimiter that includes three dots ( . . . ) can indicate that a descendant method call should be selected for the translated expression.

As mentioned previously, the subject invention contemplates employment with respect to XML. The following code sample shows how a portion of methodology 800 can be implemented, for instance in a compiler in accordance with an aspect of the subject invention. In the subject example, a method VisitQualifiedIdentifier returns the expression that represents the member (QualifiedIdentifier) of a specific class. If the expression is null, meaning the member was not found, then the following method GetDynamicProperty can be called.

```
private Expression GetDynamicProperty(QualifiedIdentifier
qualifiedIdentifier){
  //Get the qualifier type
  TypeNode t = qualifiedIdentifier.Qualifier.Type;
  //Get the QualifiedIdentifier name
  string propName =
  qualifiedIdentifier.Identifier.SourceContext.SourceText;
  //Choose the method based on whether the name starts with "@"
  Identifier methodName = propName.StartsWith("@") ? new
Identifier("DotAttribute") : new Identifier("Dot");
  TypeNode[ ] args = new TypeNode[ ]{SystemTypes.String};
  if (t != null && t.GetMethod(methodName, args) != null)
  //Get the method from the type
    Method m = t.GetMethod(methodName, args);
    MemberBinding dynamicBinding = new MemberBinding(qualifier, m);
  //Replace the qualified identifier with a method call and return it
    MethodCall mc = new MethodCall(dynamicBinding, new
    ExpressionList( ),
Nodetype.MethodCall, m.ReturnType);
    mc.Operands.Add(new Literal(propName, SystemTypes.String));
    if(ns != null) mc.Operands.Add(new Literal(ns, SystemTypes.String));
    return mc;
  else
    return null;
}
```

Here, the programmatic expression is referred to as a qualified identifier. In the first portion of the code, the type of the qualified expression is received. In the case of XML, this could be an XPathIterator type. The qualifiedtype property name is received. For example, in a qualified identifier expression such as books.price, the price would be the property name. In another code section, a method is chosen based on whether the name property name starts with or a delimiter includes a "@," namely either DotAttribute or Dot. The method also determines the arguments for the particular method; In the above example, the argument would simply be price. The type of the first member is subsequently bound to the chosen method. In the subject example, this could correspond to binding book, or more specifically the type thereof, to a dot method call. Finally, the chosen method and the arguments are appended together to generate a translated expression or qualified identifier such as books. Dot("price").

Furthermore, it should be noted that in XML there is a notion of namespaces, for example <xmlns: x="http:// . . . ">. What this means is that all names are prefixed with a specified namespace. For example, a user could specify a namespace in a qualified identifier or programmatic expression such as book.x:price. The systems and methods of the subject invention can see that colon and determine that they need to lookup the namespace. When a generic method call is generated the namespace can be provided as the second argument, for example books.Dot("price", http:// . . . ).

Figure 9:
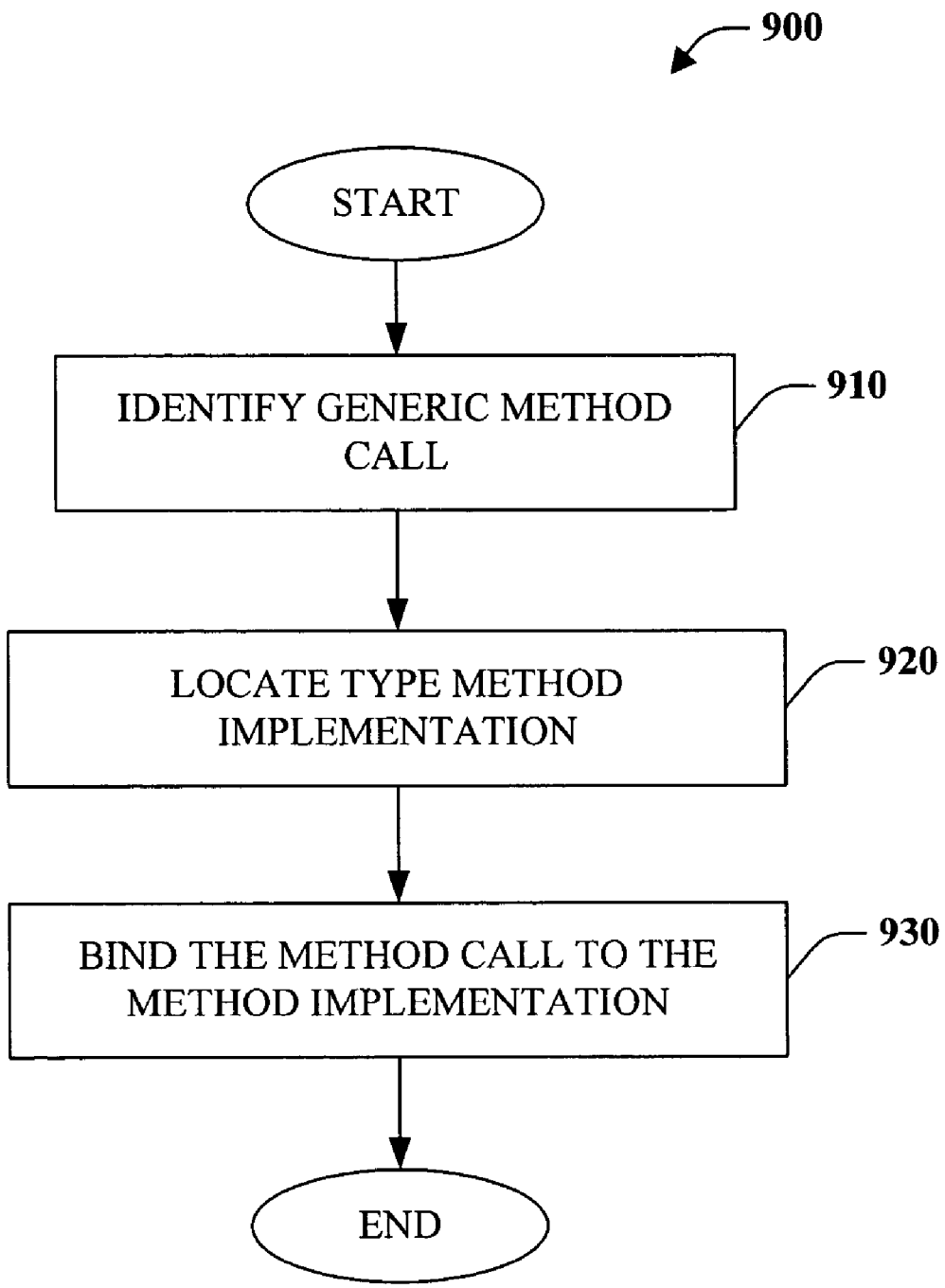
FIG. 9 is a flow chart diagram of a compilation methodology in accordance with an aspect of the subject invention.

FIG. 9 is a flow chart diagram depicting a compilation methodology 900 in accordance with an aspect of the subject invention. At 910, a generic method call is identified, such as Dot( ) or DotAttribute( ). At 920, a type method implementation is located, for example for an expression X.Dot("Y"). The type of X associated with the generic method call Dot ("Y") can be located in the type class of X. At 930, the generic method call is bound to the located or identified type method implementation. Accordingly, execution of the generic method call will produces results specific to the type.

The following sections provide examples of how generic method calls such as Dot can be implemented using the System.Xml.XPath classes, namely XPathDocument, XPathNavigator, and XPathNodeIterator.

The first class created is XPathNavigatorCollection as provided herein as Appendix A. This class is the return type for every "Dot" method. It returns a collection of DynamicXPathNavigator, which is a wrapper around XPathNavigator. Each navigator points to a specific Xml node. It should be noted that the DotAttribute is not implemented in this class since an Xml attribute cannot have child nodes.

The next class is the DynamicXPathDocument class, which is a wrapper for the XPathDocument class. This class is initialized by passing the URL (Uniform Resource Location) for the XML document similar to the XPathDoucment class. Furthermore, the Dot and DotAttribute methods are implemented herein. For example:

```
public class DynamicXPathDocument {
  private XPathDocument doc;
  public DynamicXPathDocument(string documentURI) {
    doc = new XPathDocument(documentURI);
  }
  public XPathNavigatorCollection Dot(string propName){
    return new
    XPathNavigatorCollection(doc.CreateNavigator( ).Select(propName));
  }
  public XPathNavigatorCollection DotAttribute(string propName){
    return new
    XPathNavigatorCollection(doc.CreateNavigator( ).Select(propName));
  }
}
```

Finally, the last class is DynamicXPathNavigator. This class is a wrapper for the XPathNavigator class, which points to a specific XML node.

```
public class DynamicXPathNavigator {
  public XPathNavigator nav;
  public DynamicXPathNavigator(XPathNavigator navigator) {
    nav = navigator;
  }
  public XPathNavigatorCollection Dot(string propName) {
    return new XPathNavigatorCollection(this, propName);
  }
  public XPathNavigatorCollection DotAttribute(string propName) {
    return new XPathNavigatorCollection(this, propName);
  }
  public static implicit operator string(DynamicXPathNavigator navigator){
    return navigator.nav.Value;
  }
}
```

These three classes in combination with specialized compiler support for overloading member access on these types provide a way to overload the "." operator in an XML API and translate the member selection into a search for the applicable XML node that matches the identifier name. This provides a much more natural and straightforward means and mechanism to read and maintain code.

Figure 10:
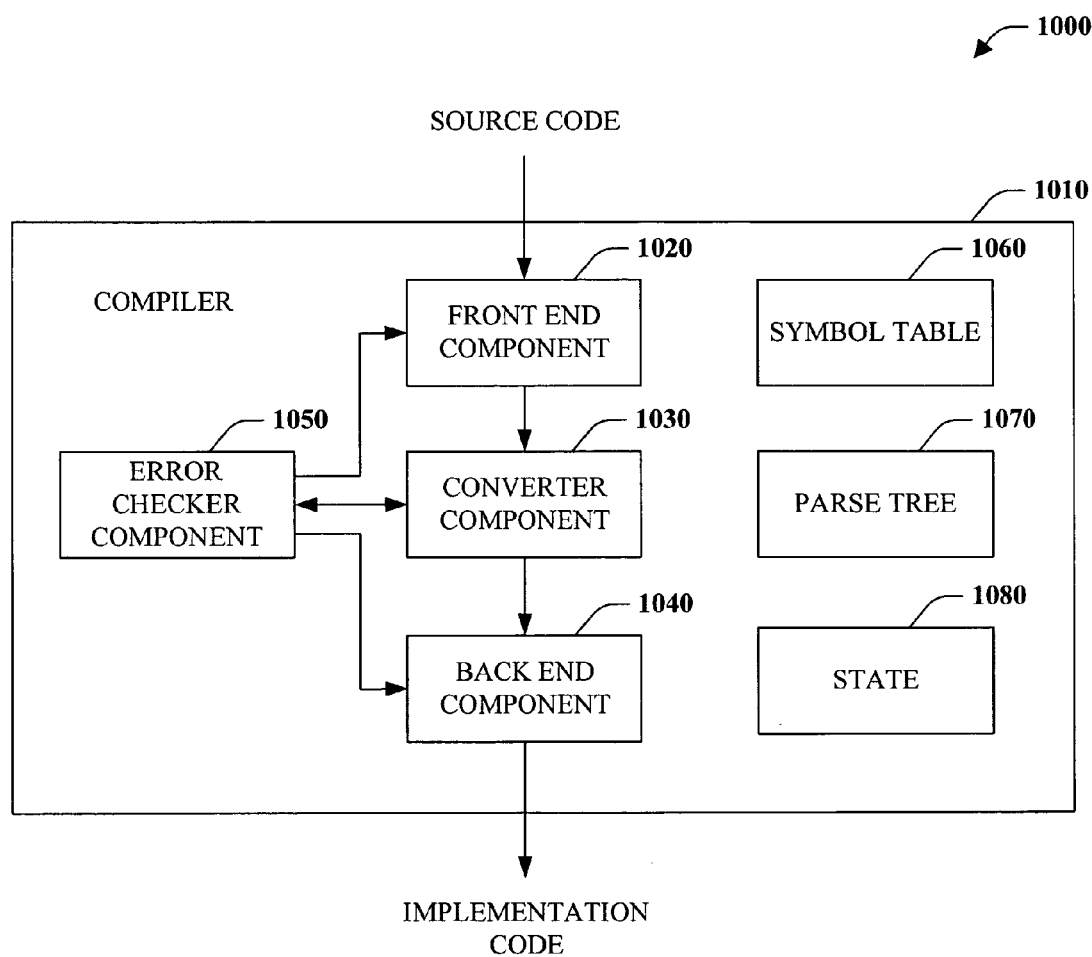
FIG. 10 is a schematic block diagram of a sample compiler environment within which aspects of the invention can be incorporated.

FIG. 10 is a block diagram depicting a compiler environment 1000 that can be utilized to produce implementation code. The compiler environment 1000 includes a compiler 1010 including front-end component 1020, converter component 1030, back-end component 1040, error checker component 1050, symbol table 1060, parse tree 1070, and state 1080. The compiler 1010 accepts source code as input and produces implementation code as output. The input can include but is not limited to delimited programmatic expressions or qualified identifier as described herein. The relationships amongst the components and modules of the compiler environment illustrated the main flow of data. Other components and relationships are not illustrated for the sake of clarity and simplicity. Depending on implementation, components can be added, omitted, split into multiple modules, combined with other modules, and/or other configurations of modules.

Compiler 1010 can accept as input a file having source code associated with processing of a sequence of elements. The source code may include code defining a collection of elements and methods for traversing such elements. Compiler 1010 may process source code in conjunction with one or more components for analyzing constructs and generating or injecting code.

A front-end component 1020 reads and performs lexical analysis upon the source code. In essence, the front-end component 1020 reads and translates a sequence of characters (e.g., alphanumeric) in the source code into syntactic elements or tokens, indicating constants, identifiers, operator symbols, keywords, and punctuation among other things.

Converter component 1030 parses the tokens into an intermediate representation. For instance, the converter component 1030 can check syntax and group tokens into expressions or other syntactic structures, which in turn coalesce into statement trees. Conceptually, these trees form a parse tree 1070. Furthermore and as appropriate, the converter module 1030 can place entries into a symbol table 1030 that lists symbol names and type information used in the source code along with related characteristics.

A state 1080 can be employed to track the progress of the compiler 1010 in processing the received or retrieved source code and forming the parse tree 1070. For example, different state values indicate that the compiler 1010 is at the start of a class definition or functions, has just declared a class member, or has completed an expression. As the compiler progresses, it continually updates the state 1480. The compiler 1010 may partially or fully expose the state 1080 to an outside entity, which can then provide input to the compiler 1010.

Based upon constructs or other signals in the source code (or if the opportunity is otherwise recognized), the converter component 1030 or another component can inject code corresponding to dot methods, among other things. Rules coded into the converter component 1030 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1060 and the parse tree 1070, a back-end component 1040 can translate the intermediate representation into output code. The back-end component 1040 converts the intermediate representation into instructions executable in or by a target processor, into memory allocations for variables, and so forth. The output code can be executable by a real processor, but the invention also contemplates output code that is executable by a virtual processor.

Furthermore, the front-end component 1020 and the back end component 1040 can perform additional functions, such as code optimization, and can perform the described operations as a single phase or in multiple phases. Various other aspects of the components of compiler 1010 are conventional in nature and can be substituted with components performing equivalent functions. Additionally, at various during processing of the source code, an error checker component 1050 can check for errors such as errors in lexical structure, syntax errors, and even semantic errors. Upon detection error, checker component can halt compilation and generate a message indicative of the error.

Figure 11:
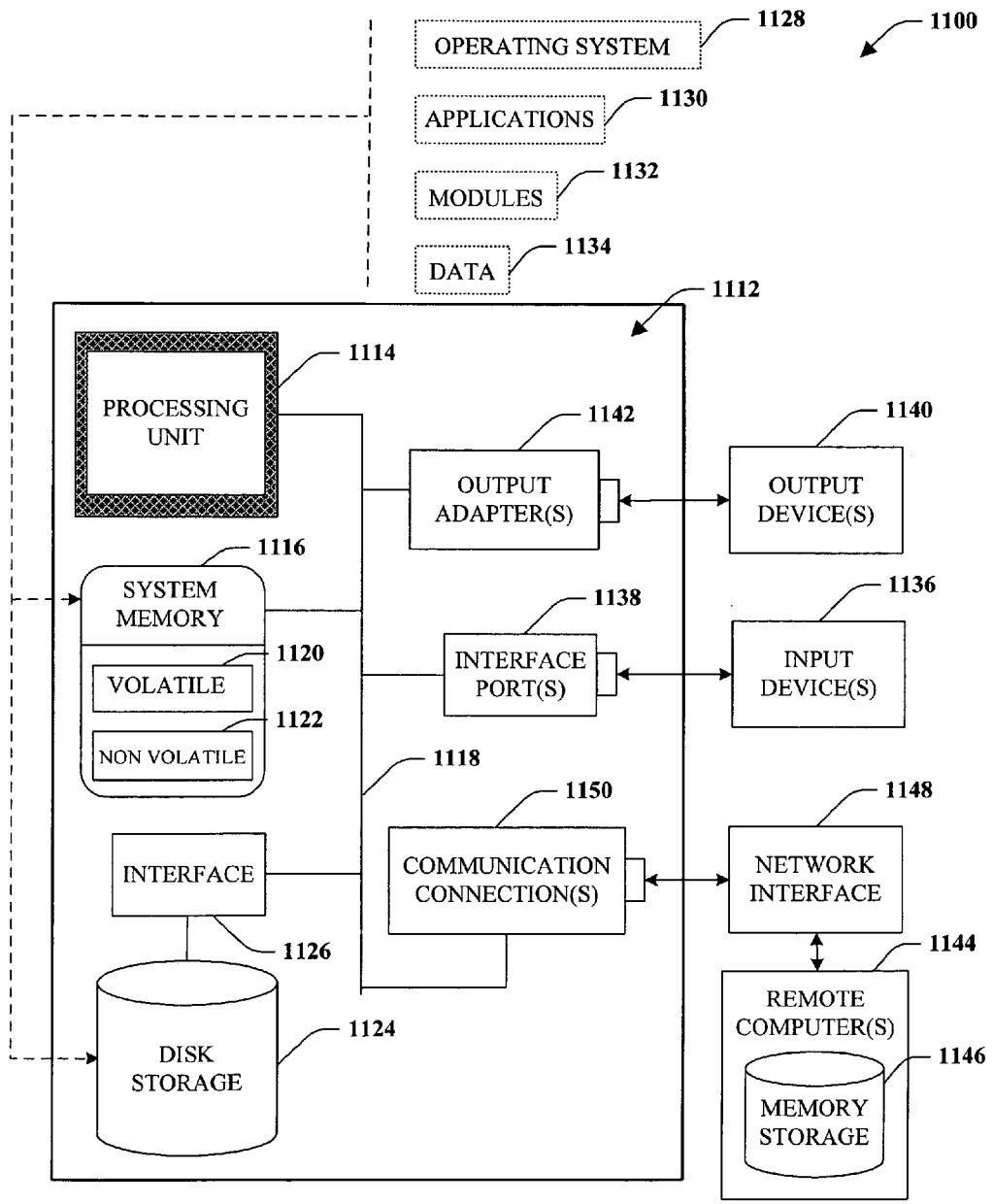
FIG. 11 is a schematic block diagram illustrating a suitable operating environment in accordance with an aspect of the subject invention.
Figure 12:
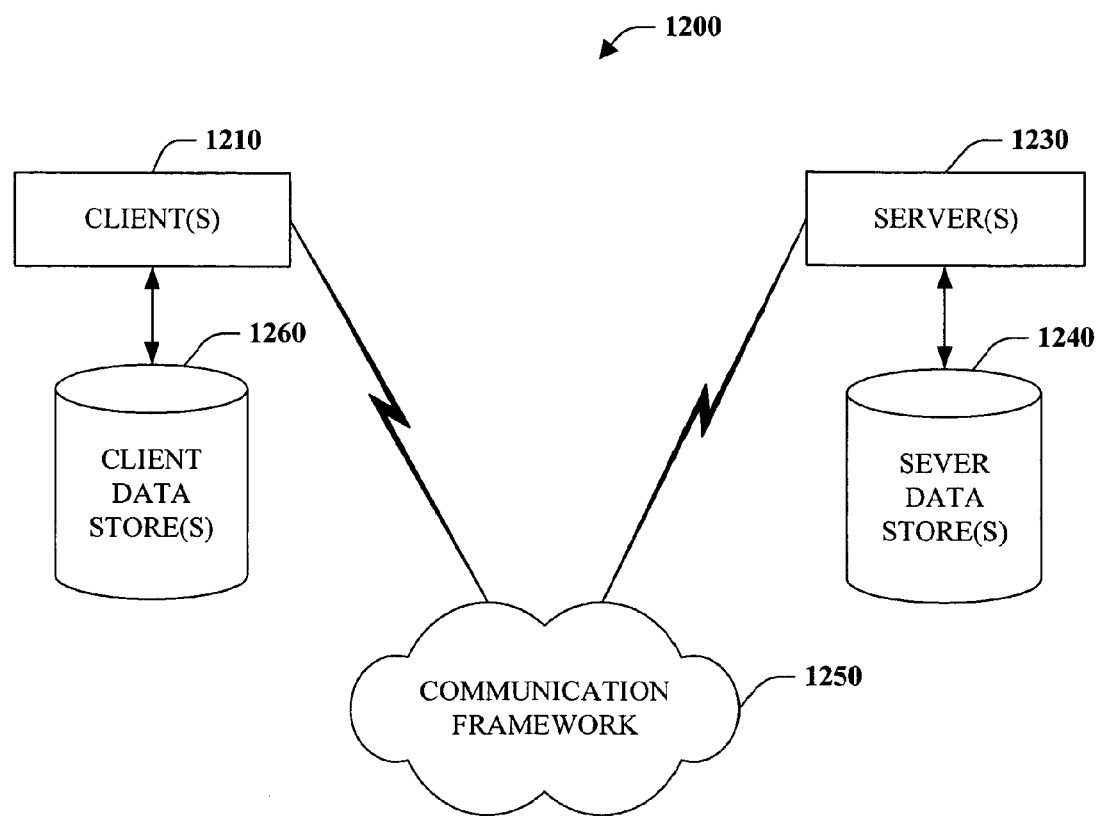
FIG. 12 is a schematic block diagram of a sample-computing environment with which the subject invention can interact.

In order to provide a context for the various aspects of the invention, FIGS. 11 and 12 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example disk storage 1124. Disk storage 4124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The server(s) 1230 can house threads to perform transformations by employing the present invention, for example.

One possible communication between a client 1210 and a server 1230 may be in the form of a data packet transmitted between two or more computer processes. The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

APPENDIX A

```
public XPathNavigatorCollection(XPathNavigatorCollection iterator, string propName)
{
    //for each navigator get all the children that match the property name
    foreach(navigator in iterator)
      Select(navigator, propName);
    e = navigators.GetEnumerator( );
}
public XPathNavigatorCollection(DynamicXPathNavigator navigator, string propName){
    //for a certain navigator get all the children that matche the property name
    Select(navigator, propName);
    e = navigators.GetEnumerator( );
}
private void Select(DynamicXPathNavigator navigator, string propName) {
//Using the XML API the property name is translated into calls to the appropriate
methods in the XPathNavigator class
    nav = navigator.nav;
    XPathNodeIterator itr;
    if(propName.StartsWith("@")) {
      propName = propName.TrimStart('@');
      newNav = nav.Clone( );
      newNav.MoveToAttribute(propName, " ");
      navigators.Add(new DynamicXPathNavigator(newNav));
    }
    else {
      itr = nav.SelectChildren(propName, " ");
      while(itr.MoveNext( )) {
        navigators.Add(new DynamicXPathNavigator(itr.Current.Clone( )));
      }
    }
}
public XPathNavigatorCollection(XPathNodeIterator iterator) {
    while(iterator.MoveNext( )) {
      navigators.Add(new DynamicXPathNavigator(iterator.Current.Clone( )));
    }
    e = navigators.GetEnumerator( );
}
//Implementation of the Dot methods simply returns a new collection of child node for
every navigator in the collection.
public XPathNavigatorCollection Dot(string propName){
    return new XPathNavigatorCollection(this, propName);
}
public IEnumerator<DynamicXPathNavigator> GetEnumerator( ) {
    return e;
}
public void Dispose( ) {
    e = null;
}
public bool MoveNext( ) {
    return e.MoveNext( );
}
public DynamicXPathNavigator Current {
    get{ return e.Current; }
}
//Implicit casting to string provides a way to get the Value of the current node in the
collection as string
public static implicit operator string(XPathNavigatorCollection col){
    enumerator = col.GetEnumerator( );
    if(enumerator==null || !enumerator.MoveNext( )) return null;
    return enumerator.Current.nav.Value;
}
```

APPENDIX A-continued

```
public DynamicXPathNavigator this[int idx] {
  get{ return navigators[idx]; }
}
}
}
```

What is claimed is:

1. A compilation system comprising:
a processor:
a memory communicatively coupled to the processor, the memory having stored therein computer-executable instructions configured to implement the compilation system including:
a receiver component that receives a delimited programmatic expression comprising a first element, a delimiter, and a second element wherein the programmatic expression is a member access expression where the first element is a receiver expression, the second element is a message identifier, and the delimiter is one of a dot (.), a series of dots ( . . . ), an exclamation point (!), or a pound symbol (#);
a type detection component that determines the type of the first element; and
a generation component that produces a translated expression based on the type of the first element and identities of the first element, the delimiter and the second element, wherein producing the translated expression comprises:
determining whether the second element represents or is a member of the type of the first element; and
generating a different type of translated expression based on whether the second element represents or is a member of the type of the first element, namely:
when the second element represents or is a member of the type of the first element, generating a translated expression that incorporates standard methods for the delimiter; and
when the second element does not represent and is not a member of the type of the first element, generating a generic method call as the translated expression, the generic method call not specifying any particular translation and not being bound to any particular method type.

2. The system of claim 1, the translated expression includes a method call to a source code that provides access to or interaction with one or more objects.

3. The system of claim 2, the source code is XML to access one or more XML objects.

4. The system of claim 3, specific delimiters map to particular XPath axis objects.

5. The system of claim 1, the message identifier is mapped to select attributes when the message identifier is in the form @name and name-space access when the message identifier is in the form prefix:name.

6. The system of claim 1, further comprising an ambiguity resolution component that determines whether special or normal member access code will be produced, when the message identifier is a direct member of the detected type.

7. The system of claim 6, the ambiguity resolution component determination is influenced by the expression delimiter such that either ambiguity component defaults to normal member access and is overridden by a particular delimiter to produce special member access code or defaults to special member access code which may be overridden by the presence of a particular delimiter to produce normal member access code.

8. The system of claim 1, further comprising a binding component that that binds the expression produced by the generation component to the type determined by the type detection component.

9. A compilation system comprising:
a processor;
a memory communicatively coupled to the processor, the memory having stored therein computer-executable instructions configured to implement the compilation system including:
means for receiving a delimited programmatic expression comprising;
a first element;
a second element; and
a delimiter, separating the first element from the second element, and wherein the delimiter is one of;
a dot (.);
a series of dots ( . . . );
an exclamation point (!); or
a pound symbol (#);
means for generating a method call based on the received expression and in accordance with a meta-object protocol, wherein a type of the method call is generated differently based on whether the second element is related to or is a member of the type of the first element and includes:
determining whether the second element represents or is a member of the type of the first element;
generating a different type of translated expression based on whether the second element represents or is a member of the type of the first element, namely:
when the second element represents or is a member of the type of the first element, generated a translated expression that incorporates standard methods for the delimiter; and
when the second element does not represent and is not a member of the type of the first element, generating a generic method call as the translated expression, the generic call not specifying any particular translation and not being bound to any particular method type; and
means for incorporating the method call into the received expression to generate a translated expression.

10. The system of claim 9, further comprising a means for binding the method call to a type specific implementation that generates valid XML code to access one or more XML objects.

11. A programmatic expression compilation method comprising:
using a processor of a computing system:
receiving a programmatic expression that includes a first element, a delimiter, and a second element, wherein the delimiter immediately follows the first element and the second element immediately follows the delimiter, and wherein the delimiter is one of a dot (.), a series of dots ( . . . ), an exclamation point (!), or a pound symbol (#);

determining the type of the first element; and generating a translated expression based on the determined type of the first element and the identities of the first element, delimiter, and second element, wherein generating the translated expression comprises:

determining whether the second element is a property or field of the type of the first element; and generating a different type of translated expression based on whether the second element is a property or field of the type of the first element, namely:

when the second element is a property or field of the type of the first element, generating a translated expression that incorporates standard methods for the delimiter; and when the second element is not a property or field of the type of the first element, generating a generic method call as the translated expression, the generic method call not specifying any particular translation and not being bound to any particular method type.

12. The method of claim 11, further comprising after generating the generic method call, binding the generic method call to a type, the type of the first element.

13. The method of claim 12, further comprising accessing objects by executing type specific code bound to the generic method call.

14. The method of claim 11, generating a translated expression comprising generating a standard access or update method provided by the object type to retrieve data specified by the second element, if the second element is a member of the first element type.

15. The method of claim 11, receiving a programmatic expression comprises receiving an expression for navigating XML documents.

16. The method of claim 12, wherein receiving the programmatic expression and generating the translated expression occur prior to compiling, and wherein binding the generic method call to a type is performed during compiling.

17. The method of claim 16, wherein the received programmatic expression is an XML document, and wherein generating the generic method call provides object-oriented access to the XML document.

* * * * *